J. H. De WITT.
Machines for Painting Wire Cloth.

No. 143,227.                    Patented September 30, 1873.

Witnesses.
Thos. S. Crane.
Wm R. Sands.

Inventor.
J. H. De Witt

UNITED STATES PATENT OFFICE.

JOSIAH H. DE WITT, OF ORANGE, NEW JERSEY.

IMPROVEMENT IN MACHINES FOR PAINTING WIRE-CLOTH.

Specification forming part of Letters Patent No. 143,227, dated September 30, 1873; application filed March 31, 1873.

*To all whom it may concern:*

Be it known that I, JOSIAH H. DE WITT, of Orange, Essex county, New Jersey, have invented a new and useful Improvement in Machines for Painting Wire-Cloth, of which the following is a full, clear, and exact description of the same, reference being had to the accompanying drawings.

Whereas wire-cloth for screens can be woven in pieces of more than fourteen hundred yards in length, and whereas it can be bought to much greater advantage by the consumer in pieces of great length, whereby waste in cutting it up for the manufacture of screens is avoided, therefore I have devised the following method of painting wire-cloth, and drying the same immediately, so that it can be rolled up for transportation or storage in pieces as long as may be required.

By the usual method of painting wire-cloth the length of a piece that can be painted and dried is limited by the space at the disposal of the manufacturer, unless, as in some cases, a lofty tower is arranged in which to hang the sections of cloth as they are painted; but by my process the drying of the paint upon the cloth occupies so short a time (from fifteen to twenty minutes) that the painting, drying, and rolling up of the cloth are made a continuous operation, which might even be made simultaneous with the weaving, as now done in the positive-motion loom. Thus, while the customary length of the cloth sent to market is fifty feet, upon which a considerable waste is often incurred in cutting, I am enabled to furnish wire-cloth, as stated above, in pieces forty-two hundred feet long, or as long as they can be woven.

Figure 1:
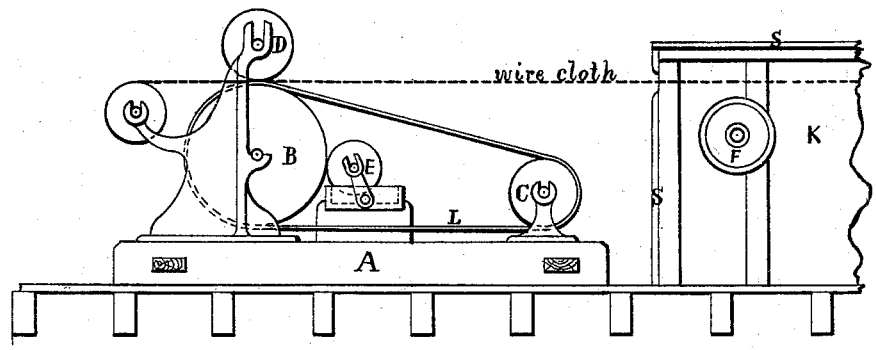
Figure 2:
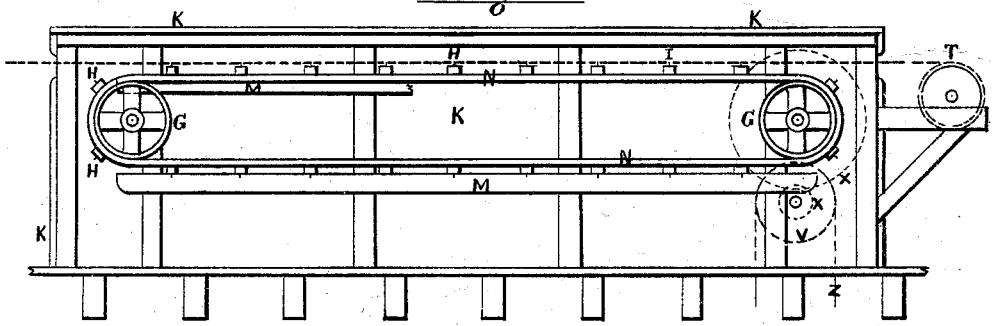

To enable others to understand my invention I would refer to the drawings accompanying this specification, and forming part of the same, of which Figure 1 is a side elevation of the painting-machine; Fig. 2, a side elevation of the drying-machine; and Fig. 3, a plan of the latter.

My invention relates to that class of machines in which the wire-cloth is passed between porous surfaces saturated with paint. It also embraces devices for conveying the painted cloth immediately without injury to a drying-machine, by which the painted cloth is conveyed through a heated atmosphere at a suitable rate of speed, so that it is dried immediately, and can be stored and transported in the customary rolls without injury or delay.

Figure 3:
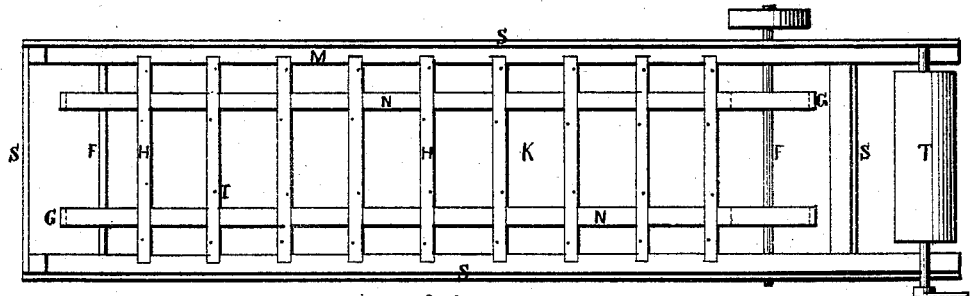

The construction of the machine is as follows: A frame-work, A, carries three rollers, B, C, and D. B and C are placed several feet apart, and drive an endless belt of porous material. D is a roller covered with porous substance, and presses upon the belt surrounding B. The belt, being saturated with paint, transfers it to the roll D, and the wire-cloth drawn between is painted by the application of the porous substance to its opposite sides. It is obvious that, instead of coating the surface of roll D with the porous felt, another belt, similar to L, might be used to transfer the paint to the cloth. It is also obvious that the rolls might be arranged in other positions than those shown to support the belts and distribute the paint to the cloth. The paint is distributed to the belt indirectly by a roll, E, supplied with paint, and revolving in contact with roller B. The paint, transferred to B, is absorbed by the inner surface of the endless belt, and penetrates through it to the roll D. The wire-cloth runs from the painting-machine, as described, to the drying-machine, which consists of two or more shafts, F, carrying upon sprocket or chain wheels endless chains, provided with cross-bars H. In the plan, Fig. 3, are shown two shafts, F, upon which are secured the chain-wheels G a distance apart less than the width of the wire-cloth. A metallic band capable of withstanding the heat could be used in place of the chains. The cross-bars H are secured to both chains at suitable intervals, and travel continuously with the movement of the chains from end to end of the heated chamber K. To prevent the paint upon the wire-cloth from abrasion against the cross-bars H, which carry it through the heated chamber, the bars are provided with pins I, which not only support the cloth a little distance above the bars, but grasp it firmly enough to carry it along. To support the bars H between the two shafts F beams M are arranged parallel to the chains N, and support the ends of the bars as they move along. The whole mechanism is inclosed by boards S, and the interior space K filled with a current of hot air introduced from below.

I am aware that carriers for wire-cloth have been used before in which belts were employed to carry the cloth from painting-machines, but the object in all such cases has been to remove the cloth from the painting-machine in sections, which might be subsequently dried separately. As the principal design of my invention is to supersede the necessity of handling the cloth in sections, I employ the carrier in a different manner, and have specified above the mode of support adopted to prevent injury to the cloth during the short time required to dry the cloth by artificial heat, as described.

The pins upon the bars H grasp the end of the web as soon as it leaves the painting-machine, and transport it continuously thereafter through the heated chamber to a winding apparatus, T, where it is formed into a continuous roll for the market. At X is shown a pair of cog-wheels and pulley, V, operated by belt Z, which keeps the shaft F in motion and draws the wire-cloth through the drying and painting machines.

Having thus described my invention, what I claim, and desire to secure by Letters Patent, is—

1. The painting-machine, constructed and operated substantially as described, with the belt or belts L and rolls B, C, D, and E, or their equivalents, to distribute paint to the wire-cloth.

2. The drying-machine, constructed with endless chains or belts and cross-bars with pins, and operated within a heated chamber, K, substantially as described.

3. The combination and arrangement of the drying-machine, constructed with endless chains or belts, and cross-bars with pins, and operated within a heated chamber, K, with a painting-machine for painting wire-cloth in a continuous web.

March 27, 1873.

J. H. DE WITT.

Witnesses:
THOS. S. CRANE,
WM. R. SANDS.